June 19, 1956     R. F. WANDELT     2,750,719
PACKAGING METHOD
Filed April 21, 1952
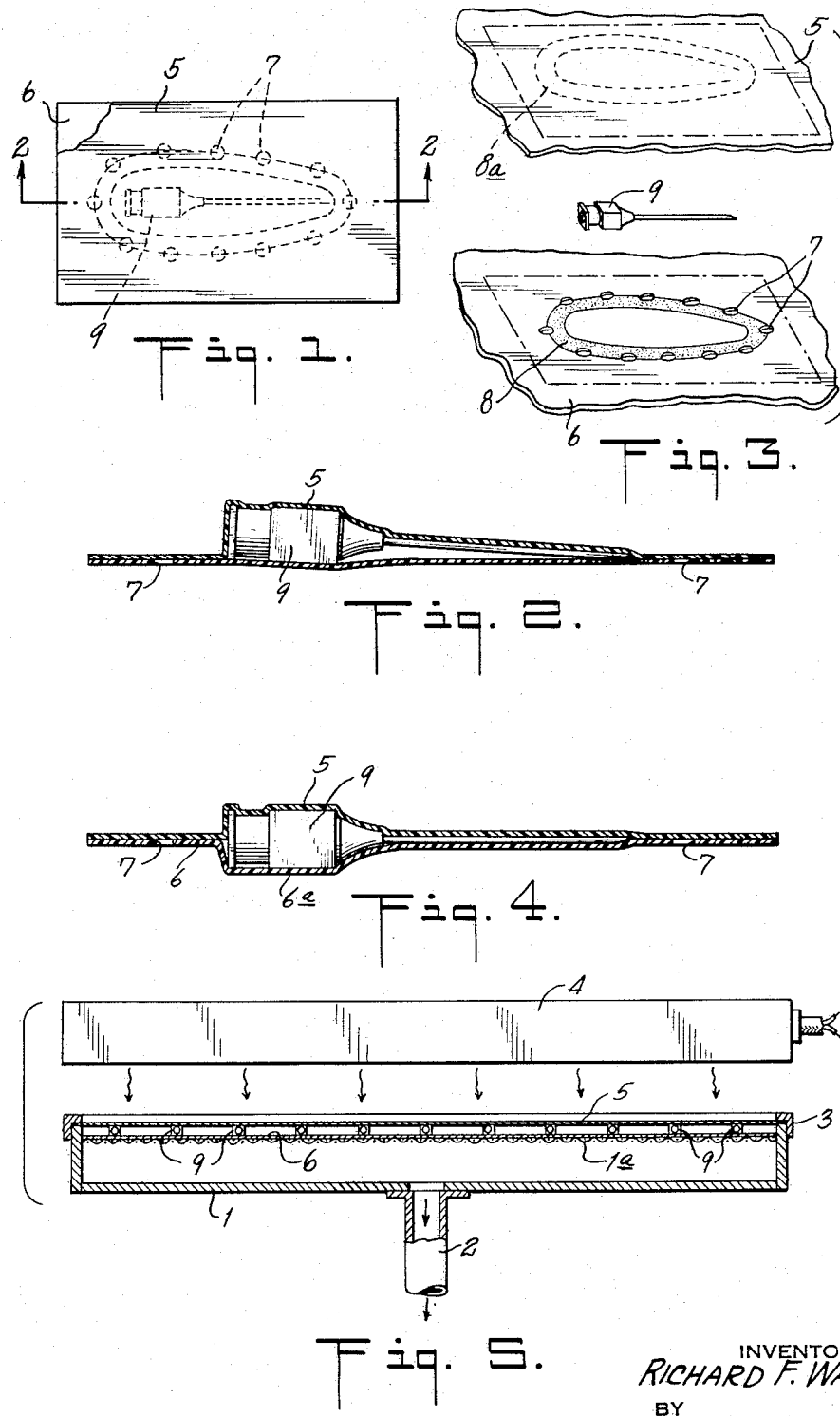
INVENTOR
RICHARD F. WANDELT
BY
ATTORNEY

2,750,719

PACKAGING METHOD

Richard F. Wandelt, Gladstone, N. J., assignor to Industrial Radiant Heat Corporation, Fairmount, N. J., a corporation of Delaware Application April 21, 1952, Serial No. 283,296

6 Claims. (Cl. 53—22)

This invention relates to a method for packaging articles so as to produce packages wherein the articles are encased tightly by sheets of sheet plastic molded to the articles.

One of the objects is to provide a method permitting the use of a vacuum molding machine for the production of the packages. Another object is to provide for a convenient and effective way of encasing articles between two sheets of plastic so as to produce attractive packages with the articles protected against contamination in general. Other objects will be understood from the following disclosure.

A specific example of the invention is disclosed hereinafter with the aid of the accompanying drawings in which:

Fig. 1 is a top view of one of the finished packages;

Fig. 2 is a longitudinal section taken on the line 2—2 in Fig. 1;

Fig. 3 is an exploded view showing the manner in which the package is assembled;

Fig. 4 is the same as Fig. 2 excepting that it shows a modification; and

Fig. 5 is a vertical section view showing a vacuum molding machine being used to make the packages.

Referring first to Fig. 5, the main parts of the vacuum molding machine are herein illustrated. A mold box 1 is shown with a suction pipe 2, and with its rim provided with a clamping frame 3. A radiant heater 4 is mounted above the mold box so as to radiate heat uniformly to a thermoplastic sheet 5 shown clamped in position by the clamping frame 3 so that the sheet is stretched flatly above the space within the mold box.

In the prior art use of such a machine a perforate mold with a top relief pattern is first mounted inside of the box 1, where it is beneath the sheet 5, the heater 4 renders the sheet 5 plastic by radiating heat to the sheet, and, when the sheet becomes plastic, a source of vacuum is connected to the suction pipe 2 and the air is sucked from the mold box so that the atmospheric pressure molds the sheet 5 to the relief pattern of the mold in the box. Such machines are used to produce thin molded sheet products. The final product is the molded sheet which is removed from the mold.

In accordance with the present invention the mold box 1 is provided with a flat perforate supporting wall 1a which may comprise a sheet of fine copper or brass screening of from 50–80 wire mesh fineness. The mold box 1 and this sheet of screening 1a form a chamber beneath the screening from which the air may be exhausted, the screening forming the perforate wall.

The package elements include a bottom sheet of material 6 which is preferably a plastic of the thermoplastic type. A plurality of groups of holes 7 are formed, as by punching for example, through the sheet 6 with the holes in each group defining a profile. A profile of thermoactive adhesive 8 is applied to the top of the sheet 6, by printing methods for example, at each group of holes 7 so that there is at least some of the adhesive on top of the sheet 6 between the inside edge of each of the holes and the space encompassed by the two profiles. One of the groups of holes with the profile of adhesive is shown by Fig. 3 in detail.

The articles to be packaged, in this case hypodermic needles 9, are laid on top of the sheet 6 so that each article is entirely within one of the profiles of holes 7 and adhesive 8. The previously described thermoplastic sheet 5, which forms the top sheet of the package, is then clamped above the articles 9 by the clamping frame 3. Before this is done, profiles 8a of thermoactive adhesive, similar to the profiles 8, are applied to the bottom side of the sheet 5 so as to register with the profiles 8 which are applied to the top of the sheet 6. The holes 7 are adjacent to the inner limits of the adhesive profiles 8, as previously indicated.

Now with the sheet 5 clamped by the frame 3, which makes the sheet 5 air tight respecting the wall 1a and the sheet 6, and in effect sandwiches the articles between the two sheets, the vacuum molding machine may be put through its usual cycle. This may consist in radiating heat from the heater 4 to the sheet 5 until the latter becomes plastic, whereupon the source of vacuum is connected to the suction pipe 2 so that the sheet 5 is vacuum molded on the sheet 6 and on and about the surfaces of each of the articles 9. The heating is discontinued at the appropriate time. Since the sheet 5 is hot the thermoactive adhesive 8a is thoroughly activated and by conduction it activates the adhesive 8. The suction is maintained until cooling has adequately set or hardened the adhesive.

The result is a sheet comprising a large number of packages, the individual packages being severable by any suitable mode of severance so as to produce individual packages such as are shown by Figures 1 and 2. Although the sheet 6 may be thermoplastic it can now be seen that the sheet 5 must be capable of being rendered plastic by heat. In some instances other means may be used for causing the sheets to adhere together than by using the adhesive profiles 8 and 8a, but a suitable thermoactive adhesive applied to the bottom of at least the top sheet 5 is considered to be of advantage. The vacuum molding is effected by withdrawing the air through the holes 7 and the adhesive must be effective to ultimately seal these holes 7 air tightly.

In the modification shown by Fig. 4 the bottom sheet 6 is provided with a depression 6a formed within each of the profiles of holes 7 and adhesive 8. The depression 6a may have a depth so as to more or less receive the article 9. These depressions have the advantage of permitting the articles to be placed in the depressions and the sheet 6 manipulated somewhat in the fashion of a tray without the articles being dislodged from within the described profiles. Also the depressions assist in initially locating the articles properly.

As examples of suitable thermoplastic materials for the sheets 5 and 6, either rigid vinyl chloride vinyl acetate, cellulose acetate or polystyrene may be used. The material may be colored or not and may be rendered opaque if desired, all as is known in the art of plastics. The holes 7 may be from .015" to .045" in diameter. There must, of course, be at least one hole for each article and the profile of holes, using a relatively large number of closely spaced holes, is considered to be preferable so that the air may be withdrawn from between the sheets as instantaneously as possible once the sheet 5 is rendered adequately plastic by the heat. All of the following thermoactive adhesives have been used successfully:

Acryloid adhesive B-7 w/Toluene, manufactured by Rohm & Haas Co., Philadelphia, Pennsylvania.

Acryloid adhesive B-72 w/Toluene, manufactured by Rohm & Haas Co., Philadelphia, Pennsylvania.

Clear Synthetic 69 x–1031 w/Toluene, manufactured by the Stanley Chemical Co., East Berlin, Connecticut.

The sheet 5 is preferably positioned by the frame 3 so that it either just touches the tops of the articles 9 or clears them by about one-sixteenth of an inch prior to operation of the machine. In other words, the sheet 5 should be quite close to the articles but positioned so as to avoid substantial deformation of the sheet 5 by reason of the latter actually bearing down on the articles prior to the molding cycle.

Any suitable means may be used for heating the sheet 5. The source of vacuum preferably should be sufficient to suddenly drop the pressure in the mold box and the timing preferably should be such that this is done just when the sheet 5 becomes plastic. The vacuum may be adjusted to effect the molding without rupturing the plastic in case the article being packaged is such that there must be unsupported spans of the thermoplastic upper sheet. In the case of the Fig. 4 modification, the vacuum should not be so great as to flatten out the lower sheet 6 with consequent loss of the depression 6a. The vacuum should not be greater than can be sustained by the screening 1a.

Each resulting package includes the article sandwiched between the two plastic sheets with the top sheet molded to the article, the sheets being joined together between the holes and the article and the interior of the package being, of course, initially evacuated. In the event of a puncture, the form of the package is preserved because the cold thermoplastic does not then lose its molded shape.

I claim:

1. A packaging method including applying a profile of thermoactive adhesive to a sheet and forming a plurality of interspaced holes through the sheet adjacent to but spaced from the inner limits of the profile, supporting this sheet by means of a perforate wall with the profile facing away from the wall, placing an article to be packaged against the sheet and within the profile, applying a substantially similar profile of thermoactive adhesive to a thermoplastic sheet, positioning the thermoplastic sheet opposite to the other sheet without material deformation due to contacting the article and with the profiles interfacing, sealing the space between the thermoplastic sheet and the wall air-tightly, heating the thermoplastic sheet throughout to render it plastic, and applying suction to the side of the perforate wall opposite to the sheets and the article therebetween.

2. A packaging method including applying a profile of thermoactive adhesive to a sheet and forming a plurality of interspaced holes through the sheet adjacent to but spaced from the inner limits of the profile, supporting this sheet by means of a perforate wall with the profile facing away from the wall, placing an article to be packaged against the sheet and within the profile, applying a substantially similar profile of thermoactive adhesive to a thermoplastic sheet, positioning the thermoplastic sheet opposite to the other sheet without material deformation due to contacting the article and with the profiles interfacing, sealing the space between the thermoplastic sheet and the wall air-tightly, heating the thermoplastic sheet throughout to render it plastic, and applying suction to the side of the perforate wall opposite to the sheets and the article therebetween, the method further including the formation of a depression in the sheet having the holes inside of the profile and shaped to receive the article, the article being nested in the depression prior to the said heating and application of suction.

3. A method of packaging by using a vacuum molding machine having a heater, said method including forming a plurality of groups of holes in a plastic sheet with the holes in each group defining a profile, supporting the sheet in the machine's mold box with the articles to be packaged on the sheet and each surrounded by one of the profiles, stretching a thermoplastic sheet above the articles and sealing it on the mold box, the interfacing surfaces of the sheets being provided with an adhesive for sealing them together, and operating the vacuum molding machine to heat the thermoplastic sheet throughout and evacuate the mold box.

4. A method of packaging by using a vacuum molding machine having a heater, said method including forming a plurality of groups of holes in a plastic sheet with the holes in each group defining a profile, supporting the sheet in the machine's mold box with the articles to be packaged on the sheet and each surrounded by one of the profiles, stretching a thermoplastic sheet above the articles and sealing it on the mold box, the interfacing surfaces of the sheets being provided with an adhesive for sealing them together, and operating the vacuum molding machine to heat the thermoplastic sheet throughout and evacuate the mold box, said adhesive being a thermoactive adhesive applied to one of the sheets as a profile between each profile of holes and the article.

5. A method of packaging by using a vacuum molding machine having a heater, said method including forming a plurality of groups of holes in a plastic sheet with the holes in each group defining a profile, supporting the sheet in the machine's mold box with the articles to be packaged on the sheet and each surrounded by one of the profiles, stretching a thermoplastic sheet above the articles and sealing it on the mold box, the interfacing surfaces of the sheets being provided with an adhesive for sealing them together, and operating the vacuum molding machine to heat the thermoplastic sheet throughout and evacuate the mold box, said adhesive being a thermoactive adhesive applied to one of the sheets as a profile between each profile of holes and the article, the thermoplastic sheet being initially stretched adjacent to the articles without material deformation by the latter.

6. A method of packaging by using a vacuum molding machine having a heater, said method including forming a plurality of groups of holes in a plastic sheet with the holes in each group defining a profile, supporting the sheet in the machine's mold box with the articles to be packaged on the sheet and each surrounded by one of the profiles, stretching a thermoplastic sheet above the articles and sealing it on the mold box, the interfacing surfaces of the sheets being provided with an adhesive for sealing them together, and operating the vacuum molding machine to heat the thermoplastic sheet throughout and evacuate the mold box, the sheet having the holes being formed with depressions substantially fitted by the articles within each of the hole profiles.

References Cited in the file of this patent

UNITED STATES PATENTS

| | | |
|---|---|---|
| Re. 20,564 | Salfisberg | Nov. 30, 1937 |
| 1,003,114 | Kirchhoff | Sept. 12, 1911 |
| 1,871,687 | Hammersley | Aug. 16, 1932 |
| 1,970,193 | Riebel | Aug. 14, 1934 |
| 2,155,445 | Pittenger | Apr. 25, 1939 |
| 2,210,509 | Strauch | Aug. 6, 1940 |
| 2,387,812 | Sonneborn | Oct. 30, 1945 |
| 2,461,660 | Salfisberg | Feb. 15, 1949 |
| 2,546,721 | Campbell | Mar. 27, 1951 |